UNITED STATES PATENT OFFICE.

FRITZ ACH, OF MANNHEIM, GERMANY, ASSIGNOR TO THE FIRM OF C. F. BOEHRINGER & SOEHNE, OF MANHEIM-WALDHOF, BADEN, GERMANY.

TRIPHENYL-METHANE DYE AND PROCESS OF MAKING SAME.

SPECIFICATION forming part of Letters Patent No. 707,813, dated August 26, 1902.

Application filed December 22, 1900. Serial No. 40,762. (Specimens.)

*To all whom it may concern:*

Be it known that I, FRITZ ACH, a citizen of the Empire of Germany, residing at Mannheim, in the Empire of Germany, have invented certain new and useful Improvements in the Manufacture of Dyes; and I do hereby declare the following to be a full, clear, and exact description of the invention, such as will enable others skilled in the art to which it appertains to make and use the same.

The present invention relates to the manufacture of dyes, and in particular those dyes classed as phenyl-methane dyes.

In my application, Serial No. 731,674, filed September 25, 1899, I have described a method of preparing amido-phenyl-tartronic acid, $NH_2.C_6H_5.C(OH)(COOH)_2$, and a series of substitution products of the same, including other amido-phenyl-tartronic acids. I have found in the course of my experiments that amido-phenyl-tartronic acids and their derivatives constitute highly-important materials in the art of preparing dyes, since from the same there may be prepared with great facility triphenyl-methane dyes.

The object of my invention is therefore to utilize the said amido-phenyl-tartronic acids and their derivatives as starting materials in the manufacture of these dyes, and for this purpose the same consists, essentially, in oxidizing a mixture of "amido-phenyl-tartronic acid," under which term I desire to be understood as covering also the salts, homologues, and derivatives of said acids, together with primary, secondary, or tertiary aromatic bases—that is to say, bases which are suitable for the production of triphenyl-methane dyes. Suitable oxidizing agents for this purpose are ferric compounds, arsenic acid, nitrobenzene, nitrotoluene, nitronaphthalene, and the like. The last-mentioned nitro compounds are preferably used together with iron salts.

The preparation of triphenyl-methane dyes is carried out with particular facility according to the above process when employing the primary amins, the fuchsins so obtained excelling in the purity and uniformity of their tints or shades. A further advantage of my process is to be found in the fact that these syntheses proceed at a considerably-lower temperature than required for the processes for preparing fuchsin hitherto employed. Finally, it is to be noted that my new process leaves a very small quantity of residues of manufacture and is therefore highly economical.

My invention also consists in such further features as will be hereinafter set forth, and pointed out in the claims.

In order to enable those skilled in the art to fully understand my invention and to carry the same into effect, I will now describe the same in detail, with the aid of the following examples. The proportions are understood to be by weight unless otherwise stated.

*I. Preparation of para-fuchsin.*—Thirteen and four-tenths parts of acid amino-phenyl-tartronate of potassium are added to a mixture of forty parts anilin, thirty parts nitrobenzene, forty-two parts hydrochloric acid of ten per cent. strength by volume, and thirty parts of ferrous chlorid and heated to from 110° to 130° centigrade and maintained at this temperature for from six to seven hours, while constantly stirring the mixture. The semisolid melt, which has a metallic luster, is taken up with hot water, the excess of anilin and nitrobenzene being driven off with steam, and the resultant solution of the dye is filtered while hot, so as to separate it from the resinous masses which are formed. The para-fuchsin is obtained from this solution in a pure state and in the form of a chlorid of para-fuchsin by salting the said solution with ordinary salt, (NaCl.)

*II. Preparation of fuchsin.*—If in the above example instead of the forty parts of anilin I employ a mixture of twenty parts anilin and twenty parts of orthotoluidin, the other conditions of the process remaining the same, I obtain chlorid of fuchsin of remarkable purity, the yield of the same being exceedingly good.

*III. Preparation of triamido-triortho-tolyl-carbinol, (new fuchsin.)*—Thirty-two parts of amido-tolyl tartronate of potash are intimately mixed with eighty parts of orthotoluidin, sixty parts orthonitro toluene, twenty parts of ferrous chlorid, thirty-four parts hydrochloric acid, (eleven per cent. strength by volume,) and twenty-seven parts of water and heated to from 110° to 130° centigrade and maintained at this temperature for from six to seven hours, while constantly stirring. The melt, which has a metallic luster, is taken up with hot water, the oils in excess distilled off with steam, and the resultant solution of the dye is then filtered from the small quantity of resinous substances formed. By adding common salt (NaCl) the chlorid of the new fuchsin is salted out of this solution, and thus obtained directly in a pure condition.

IV. *Preparation of dimethyl-triamido-triphenyl-carbinol.*—Thirteen and four-tenths parts of acid amido-phenyl-tartronate of potassium are intimately mixed with forty parts mono-methylanilin, thirty parts nitrobenzene, forty-two parts hydrochloric acid of ten per cent. strength by volume, and ten parts of ferrous chlorid and heated to from 110° to 130° centigrade and maintained at this temperature for four hours, while constantly stirring. The resulting melt is further treated as set forth in the above examples, and the dye is then precipitated by means of sodium chlorid.

V.—*Preparation of triphenyl-para-rosanilin.*—Sixteen parts of acid diphenyl-amido-tartronate of potassium are added to a mixture of thirty parts nitrobenzene, twenty-five parts diphenylamin, twelve parts hydrochloric acid, (specific gravity 1.19,) and ten parts of ferrous chlorid and maintained at a temperature of from 110° to 130° centigrade for six hours, while stirring the mixture. The melt is then treated with dilute soda-lye (N$_a$HO) in excess and treated with steam to drive off the excess of nitrobenzene and diphenylamin. The whole is then filtered, and the residue on the filter is dried and extracted with alcohol under the action of heat. The alcoholic solution is then filtered, and the chlorid of triphenyl-para-rosanilin is precipitated from the filtrate with hydrchloric acid and water.

VI.—*Preparation of dimethyl-diethyl-dibenzyl-triamido-triphenyl-carbinol.*—Fifteen parts of acid dimethyl-amido-phenyl-tartronate of potassium are mixed with forty parts of ethylbenzyl-anilin, thirty parts nitrobenzene, ten parts ferrous chlorid, twelve parts hydrochloric acid, (specific gravity 1.19,) and thirty parts water and maintained at a temperature of from 110° to 130° centigrade for six hours. The melt is then treated with steam, as in the above examples, and the dyestuff resulting from the above treatment, which is insoluble in water, is taken up with alcohol and purified by repeated redissolving from alcohol.

The chlorids, as well as the sulfates and acetates of dimethyl-diethyl-dibenzyl-triamido-triphenyl-carbinol, possess a luster similar to cantharides. They are soluble only with difficulty in water, but readily soluble in alcohol and alcoholic ether, the solutions having a violet color. They do not crystallize, but are separated from the hot saturated aqueous solution on cooling as violet flakes. By adding mineral acids the aqueous solution of the salts become green, while the alcoholic solutions have a pure-blue color under the same conditions. Alkalies decolorize the solution of the salts of this dimethyl-diethyl-dibenzil-triamido-triphenyl-carbinol, which action is attained by the separation of the dye base, having a light-gray color. This dye base is insoluble in water, but readily soluble in alcohol and has hitherto not been obtained in crystalline form, since it readily becomes resinous in the air and is rapidly darkened in color. By sulfurizing the base or its salts with feebly-fuming sulfuric acid at the temperature of the water-bath a violet dyestuff is obtained which is readily soluble in water and which seems to be identical with the dye known on the market as "acid violet 6B."

The salts of the dimethyl-diethyl-dibenzyl-triamido-triphenyl-carbinol dye silk as well as wool and unmordanted cotton in a rich violet shade in a neutral bath. Their affinity for animal fibers is particularly great.

It will be seen from the above that my invention admits of a large range of modifications. Broadly considered, the same involves the oxidation of an amido-phenyl-tartronic acid, together with an aromatic base and hydrochloric acid, or, what amounts to the same thing, a chlorid of such base. More specifically, the invention involves the treatment of such amido-phenyl-tartronic acid, together with an amin of the aromatic series and hydrochloric acid, in the presence of an oxidizing agent, such as nitrobenzene in combination with a ferrous salt.

Under the term "an amido-phenyl-tartronic acid" as employed in the claims I understand and include the amido-phenyl-tartronic acid proper as well as its homologues and derivatives and its salts and the salts as well as the salts of its homologues and derivatives, as will abundantly appear from the above examples given in illustration of my invention.

What I claim, and desire to secure by Letters Patent of the United States, is—

1. The process of preparing dyes which consists in oxidizing a mixture of an amido-phenyl-tartronic acid and an aromatic base.

2. The process of preparing dyes of the triphenyl-methane series which consists in heating the mixture of an amido-phenyl-tartronic acid with an aromatic base in the presence of an oxidizing agent.

3. The process of preparing dyes of the triphenyl-methane series which consists in heating the mixture of an amido-phenyl tartronic acid with an aromatic base and hydrochloric acid in the presence of an oxidizing agent.

4. The process of preparing dyes which consists in heating the mixture of an amido-phenyl-tartronic acid with an aromatic base in the presence of a nitro compound, and a ferrous salt.

5. The process of preparing dyes of the triphenyl-methane series which consists in heating the mixture of an amido-phenyl-tartronic acid with an aromatic base and hydrochloric acid in the presence of a nitro compound, and a ferrous salt.

6. The process of preparing dyes of the triphenyl-methane series, which consists in oxidizing a mixture of an amido-phenyl-tartronic acid and a primary aromatic amin.

7. The process of preparing dyes of the triphenyl-methane series, which consists in heating an amido-phenyl-tartronic acid together with a primary aromatic amin and hydrochloric acid in the presence of a nitro compound, and a ferrous salt.

8. The process of preparing dyes which consists in heating an amido-phenyl-tartronic acid together with ethyl-benzyl-anilin and hydrochloric acid in the presence of an oxidizing agent.

9. The process of preparing dyes which consists in heating dimethyl-amido-phenyl-tartronate of potassium mixed with ethyl-benzyl and hydrochloric acid, in the presence of nitrobenzene and ferric chlorid.

10. As a new dye compound, dimethyl-diethyl-dibenzyl-triamido-triphenyl-carbinol which has hitherto not been obtained in crystalline form, but tends to become resinous on exposure to air, is insoluble in water but readily soluble in alcohol, is of a light-gray color but rapidly darkens in the air, and which when treated with feebly-fuming sulfuric acid at water-bath temperature yields a violet dyestuff.

In testimony whereof I affix my signature in presence of two witnesses.

FRITZ ACH.

Witnesses:
JACOB ADRIAN,
EDUARD KÖBNER.